June 21, 1955 J. B. HARDING ET AL 2,711,429
METHOD AND APPARATUS FOR CONTROLLING
TEMPERATURE IN OLEFIN CARBONYLATION
Filed April 25, 1950
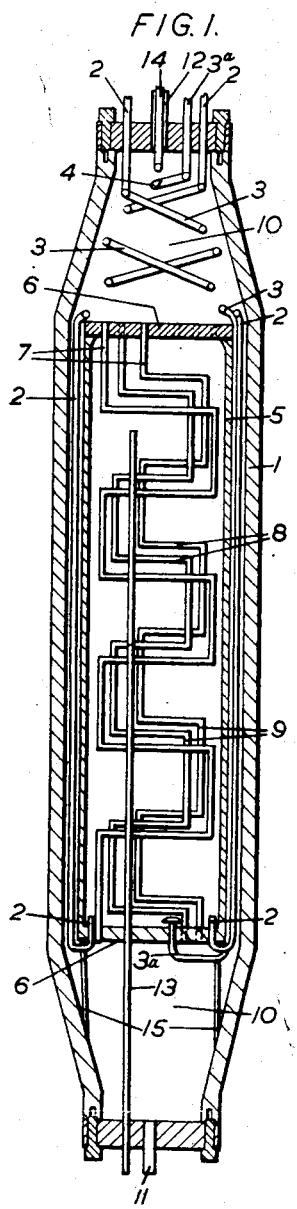
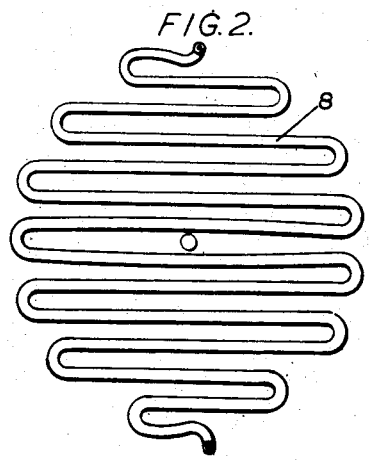
Inventors
JOHN BURNARD HARDING
CRAWFORD ALEXANDER CUNNINGHAM PETRIE
By Cushman, Darby & Cushman
Attorneys

United States Patent Office 2,711,429
Patented June 21, 1955

2,711,429

METHOD AND APPARATUS FOR CONTROLLING TEMPERATURE IN OLEFIN CARBONYLATION

John Burnard Harding and Crawford Alexander Cunningham Petrie, Norton-on-Tees, England, assignors to Imperial Chemical Industries Limited, a corporation of Great Britain Application April 25, 1950, Serial No. 157,858

Claims priority, application Great Britain May 2, 1949

9 Claims. (Cl. 260—604)

According to the present invention there is provided a method of conducting, within controlled ranges of temperature, reactions in the liquid phase between reactants of which at least one is gaseous, the molar ratio of gas to liquid theoretically required being relatively small, which comprises passing the reactants at a desired temperature and in desired proportions to a reaction zone containing a number of cooling coils, continuously passing through the coils per unit of time a volume of gas comprising at least one gaseous reactant obtained as hereinafter defined, which is at least equal to that of said gaseous reactant fed per unit of time to the reaction zone, continuously mixing the streams of gas from the reaction zone and from the coils respectively, together with make-up gas as desired, to obtain the gas for recycling to the reaction zone and to the coils, the temperature of the gas at any point in the system and the proportion of gas passed to the coils being controlled to give the aforesaid conditions in the reaction zone. An important application of the method is in processes operated under superatmospheric pressure e. g. 50 atmospheres gauge and more.

When the process is operated co-currently, preferably the reactants are introduced at, or near, the bottom of the reaction zone.

The method of the invention is of greatest value in relation to exothermic reaction and the coils in the reaction zone are then employed for cooling purposes, the gas taken off being cooled to the extent required by any suitable means, for example heat exchangers. The method of the invention is of importance in reactions in which control of temperature within very narrow limits is necessary, and then the temperature and proportion of the reactants should be closely controlled, preferably in automatic manner. Most frequently the gas fed to the reaction zone is preheated. The invention will now be described in its application to exothermic processes.

The method is suitable in particular for the exothermic process comprising the carbonylation of mono-olefines containing from 2 to 18 carbon atoms, especially those containing up to 12 carbon atoms, and cyclohexene, by means of carbon monoxide and hydrogen e. g. at pressures of 200 to 300 atmospheres gauge and temperatures of 100° to 180° C. in the presence of a cobalt catalyst, which is preferably in dissolved form, for example as the salt of a fatty acid e. g. cobalt acetate, and more especially as cobalt naphthenate. When mono-olefines containing from 2 to 5 carbon atoms are treated it is necessary or desirable to have present in the reaction zone an inert liquid medium, e. g. saturated butene trimer, an alcohol such as 3,5,5-trimethyl hexanol, or an ether such as dinonyl ether to provide the liquid phase. When such a medium is employed and it is desired to hydrogenate the carbonylation product to alcohol subsequently, it is preferred to separate the medium from the hydrogenation product, e. g. as the bottoms obtained by distillation, and to return it to the carbonylation section. While from the reaction viewpoint, a wide range of $H_2/CO$ mixtures can be employed in the process, e. g. molar ratios of from 1:1 to 4:1, it is preferred for best reaction to use a 1:1 molar ratio of $H_2:CO$, which can be done if the reactor and auxiliary equipment are lined with a CO-resistant material such as copper. However, if ordinary steel equipment is employed this ratio should be not less than 2:1 and preferably about 3:1.

Other factors permitting, it is preferred to operate the process using a proportion of cooling gas to reactant gas of at least 9:1 by volume measured at N. T. P.

Because when higher molar ratios of gas to liquid are used it is not possible to employ the usual method of cooling viz. increasing the volume of gaseous reactant relative to the liquid fed to the reaction zone, since vaporisation would occur and adversely affect the reaction, the method is of particular application in exothermic processes in which, the theoretical molar ratio of gas to liquid is in the order of from 2:1 to 4:1, but does not exceed 4:1.

Preferably, the gas which has passed through the coils is subjected to treatment, for example in a heat exchanger, for removing sensible heat absorbed by it in its passage through the coils before being combined with the stream of gas from the reactor. Preferably, also, the exit gases from the reactor are cooled, e. g. by indirect heat exchange, and liquid product carried by them is removed in one or more catchpots and returned to the main stream of liquid reaction product. It will thus be seen that the circulating gas is divided into two streams, a reaction gas stream, which is fed to the reaction zone, and a cooling gas stream which is passed through the cooling coils situated in the reaction zone, and that these streams are combined on the exit side of the reactor and returned, together with make-up gas, for distribution as before between the reaction zone and cooling coils.

The cooling coils may comprise a large number of individual elements, which may be of any desired shape and length, but preferably are of considerable length in order to fill a large volume of the reaction zone. Preferably each element or pipe is connected at both ends to a common header. This arrangement has the advantage that by providing a large number of parallel paths for the cooling gas pressure drop, and therefore power expenditure, is considerably reduced. A preferred form of coil comprises a number of superposed serpentines connected by intermediate pipes, the whole being continuous throughout its length. Preferably 12 or more of these coils are employed, each connected at both ends to common headers suitably located in the apparatus. As a further preferred feature the coils are arranged so that each serpentine is staggered linearly or angularly with respect to the serpentines of the next adjacent coils. This arrangement provides a kind of network within the reactor and promotes mixing and contact of the reactants.

As a further preferred feature of the invention, the reaction vessel is fitted with a removable reaction basket of lesser diameter than the vessel and insulated from the walls thereof by a suitable insulating material, e. g. asbestos cement. This assembly has the advantage that stress is taken by the outer forging of the reaction vessel, which is kept cool by the insulation and therefore retains its strength, and that any corrosion which occurs tends to be limited to the basket, which can be readily removed and replaced, and does not affect the more expensive heavy forging itself. When a basket is employed the coils, in particular the serpentines, traverse substantially the whole width of the basket.

Preferably the gaseous reactants are fed to the bottom of the reactor by several pipes, although a single pipe may be used if desired. When a basket is employed, the pipes preferably pass down between the basket and the walls of the outer forging and are surrounded with the before-mentioned insulation.

Preferably the gas feed pipes are fitted with spargers or roses at the bottom. Preferably, also, they are provided with expansion compensating bends in the upper part of the reactor.

If all the reactants are normally gaseous at the reaction temperatures and pressures, it is necessary for liquid phase reaction to employ an inert liquid to serve as a reaction medium and this may be introduced at various points in the reactor but is preferably introduced near the bottom thereof.

The process in its preferred form provides the advantages that the temperature in the reaction zone can be maintained within narrow limits without introducing more gas directly to the reaction zone than is permissible for the reaction or reaction conditions, and that, by the use of the common headers and serpentines, pressure drop within the cooling system is kept to a minimum and reaction within the reactor is promoted by the intimacy of contact and mixing of the reactants brought about by the network of coils.

As another important feature the invention comprises an apparatus adapted for conducting chemical processes of an exothermic character under superatmospheric pressure. The apparatus comprises in its essentials a hollow reaction vessel capable of withstanding high pressures which, optionally, is provided with a removable reaction basket insulated from the walls of the reaction vessel by suitable insulation, and which is fitted with a number of coils, connected at their ends to common headers, through which an indirect cooling medium can be circulated, thus providing a number of parallel paths, and is provided with feed pipes for the reactants delivering to the bottom of the reactor and take-off pipes for the liquid and gaseous products with intakes near the top of the reactor. Preferably, the cooling coils are in the form of separate lengths of piping of any desired shape or form connected at both ends to headers. More preferably each coil is of considerable length and comprises a number of serpentine coils, for example at least 4, connected by intermediate lengths of piping, the whole forming a continuous unit. Preferably, the number of parallel paths is the maximum possible since this gives the minimum pressure drop. In addition to removing heat of reaction the network of serpentines breaks up the gas bubbles and promotes reaction between the gaseous and liquid components. It is desirable to arrange the coils so that the serpentines are staggered linearly and/or angularly with respect to those of the next adjacent coils. In one arrangement for use with a 34' x 4' diameter reaction basket there are 13 parallel mild steel cooling coils each of 1.⅜" outside diameter and 1" nominal bore and comprising 13 serpentines. Adjacent coils are pitched at 2.4" centres, and each serpentine is 33' long.

This arrangement has the advantage that it promotes good mixing and contact of the reactants. By the use of apparatus of this kind the heat of reaction can be removed by indirect means in such manner that the temperature inside the reaction zone can be maintained within narrow limits, which is essential in many processes, and this can be achieved without introducing more gas directly to the reaction zone than is permissible for the reaction or the reaction conditions.

In using the apparatus for exothermic reactions it is preferably arranged that the cooling coil exit pipe feeds into the gaseous take-off line, that both include indirect heat exchangers and that the returned gas, together with needed make-up, is fed partly to the reactor through the gas feed line and partly to the cooling coils through a line leading to them.

A typical apparatus according to the invention is shown in vertical medial section in Fig. 1 of the drawings.

1 represents the reactor shell, which is a mild steel forging; 2, 2 two gas feed lines each provided with expansion bends 3 (actually there are seven gas feed lines in the apparatus, but for simplicity only two are shown); 3a the liquid reactant feed line with expansion bend 4 and sparger as shown; 5 the reaction basket (optional, but preferred), which is closed at top and bottom by end cover plates 6; 7 the individual cooling coils (of which there are thirteen but only three are shown for simplicity) each comprising six or seven serpentines 8 connected by intermediate lengths of piping 9, each individual coil being continuous throughout its length. The coils 7 lead through the end cover plates 6 to the common headers 10. The circulating cooling gas enters at 11 and leaves at 12, thus flowing co-current, inside the coils, with the direction of flow of the reactants. The liquid product is taken off by the pipe 13. 15 is a cylindrical stool for the basket.

The temperature is controlled by means of a sheathed thermocouple stretching to the bottom of the vessel, indicated by 14.

As described above, in the apparatus shown in Fig. 1 there are seven gas feed pipes, and these are distributed at equal distances around the circumference of the basket and are surrounded with insulation. However, the invention contemplates the use of any suitable number of gas and liquid lines as desired.

Fig. 2 shows a suitable form of serpentine coil in plan view.

*Example*

Using the apparatus described, di-isobutylene was reacted in the liquid phase with carbon monoxide/hydrogen mixture containing 25% carbon monoxide at a total pressure of 250 atmospheres gauge and a temperature of 140°–170° C., in the presence of 0.1% of cobalt fed as naphthenate dissolved in the feed. The di-isobutylene and carbonylating gas feed pipes entered the top of the reactor and introduced the reactants to the reaction zone at the bottom of the basket.

The capacity of the converter was 5 cubic metres (176.8 cubic feet) and the rates of flow were approximately as follows: 2.5 cubic metres (88.4 cubic feet) of liquid di-isobutylene per hour, 2500 cubic metres (88,400 cubic feet) of carbonylating gas per hour, and 36,000 cubic metres (1,271,160 cubic feet) of cooling gas per hour. In effect 1,900 cubic metres (67,089 cubic feet) of residual gas from the reactor together with 500 cubic metres (17,680 cubic feet) per hour of hydrogen make-up and 270 cubic metres (9,534 cubic feet) of carbon monoxide make-up are mixed with 36,000 cubic metres (1,271,160 cubic feet) of cooling gas comprising carbon monoxide and hydrogen, and the whole is recycled and distributed between the reactor and cooling gas circuits in the same proportions as before.

In the apparatus employed there were 13 cooling gas paths in parallel, each of 1.⅜" outside diameter and 1" nominal bore mild steel tubing and comprising 13 serpentines, one di-isobutylene feed pipe, and 7 carbonylating gas feed pipes.

The carbonylating gas was fed to the reaction zone at a temperature of 140° C. and the gaseous reactants leaving the reaction zone were at 170° C.; the cooling gas entered the coils at 120° C. and left them at 155° C.; and after mixing these streams the cooled joint gas stream had a temperature of 105° C., rising to 120° C. after passing through the circulating pump. The reaction gas feed was preheated to 140° C. before entering the reaction zone.

As further features of the invention the apparatus and process are also applicable to endothermic reactions, provided the reaction temperature is not too high, in which case the procedure is to employ the same gas cycle and distributing system, but to pass heating gas through the coils instead of cooling gas. The circulating gases are heated in one or more heat exchangers. The reactants are preheated and brought together in the reaction zone, the temperature therein being controlled within the desired limits by controlling the temperature and quantity of gas passing through the coils.

As in exothermic, so in endothermic processes, the proportion of gas passing through the coils is preferably at least nine times that fed to the reaction zone, and the method of the invention is of particular value in processes in which the theoretical molar ratio of gas to liquid is in the order of from 2:1 to 4:1, but does not exceed 4:1. It will be understood that in both types of processes it is necessary to employ a proportion of gaseous reactant in excess of the stoichiometric amount in order to cause the reaction to proceed, and in practice, therefore, the molar ratio of gas to liquid may be as high as 7:1, but should not exceed this.

If desired there may be a number of headers at each end of the coils, but this does not give as good results as a single header. It is of advantage to use a header of relatively large size.

In this specification by parallel paths is meant, by analogy with electrical terminology, paths between whose ends the same pressure drop exists.

Instead of a serpentine there may be used any other shape or form of coil having considerable length and adapted to pack conveniently with adjacent similar coils.

In the apparatus above described (4′ diam.) we have found good results are obtained using for each 2.4″ depth of reaction space containing liquid a 33′ long 1.⅜″ outside x 1″ inside diameter mild steel serpentine pipe. For each such 2.4″ depth the linear length of this pipe per square foot of cross-sectional area of the reactor approximately $$= \frac{33}{\frac{22}{7} \times 2^2} = 2.6'$$

Most frequently, to achieve the benefits of the invention in major degree, it is desirable that this figure should not be less than 2.0 and preferable that it should exceed 2.6, especially when the reaction is highly exothermic. Hence, the heat transfer characteristics of the pipes employed for each 2.4″ depth of reaction space should be at least equivalent to those of 2′ of the aforesaid mild steel pipe per square foot of cross sectional area of reaction space, and preferably equivalent to more than 2.6 ft. per square foot similarly defined.

We claim:

1. A method of conducting within controlled ranges of temperature reactions at super-atmospheric pressure in the liquid phase between reactants of which at least one is gaseous, the molar ratio of gas to liquid theoretically required being relatively small, which comprises passing gaseous reactant upwardly through a vertically elongated reaction zone countercurrently to the liquid component, both being at desired temperature and in desired proportions and simultaneously controlling the temperature of the reactants in said zone by passing a greater amount of said gaseous reactant than fed to said zone per unit of time through a plurality of paths in indirect heat transfer with the liquid and in the form of a close network which brings the ascending gas into intimate contact with said liquid, continuously mixing the stream of gas from the reaction vessel and from the said paths respectively together with makeup gas as desired to obtain the gas for recycling to the reaction zone and to the paths, the temperature of the gas and its proportion being controlled to give the desired conditions in the reaction zone.

2. A method as set forth in claim 1 in which olefines containing from 2 to 12 carbon atoms are carbonylated at a temperature of 100° to 180° C. and at a pressure of from 100 to 300 atmospheres gauge in the presence of a dissolved cobalt catalyst, the molar ratio of reactant gas to liquid being not over 4:1.

3. A method as set forth in claim 1 in which the volume of gas comprising gaseous reactant passed through said plurality of paths per unit of time is at least nine times that fed to the reaction zone per unit of time.

4. Apparatus adapted for use with exothermic or endothermic chemical processes conducted under superatmospheric pressure in the liquid phase between reactants of which at least one is gaseous which comprises a hollow vessel capable of withstanding high pressure, a reaction chamber situated wholly within said vessel, gas and liquid supply conduits to said chamber, the former capable of delivering gas to the chamber near the bottom, a product discharge conduit therefrom, a plurality of heat exchange coils each traversing the said chamber and each having a length within the chamber which is greater than the length of the same, the whole being arranged throughout the reaction chamber in the form of a close network serving to bring the ascending gas into intimate contact with the liquid within the said reaction chamber, headers at each end of and isolated from the reaction chamber with which the ends of the coils connect, a gas recycle system comprising branches on the supply side of the reactor for distributing a gas comprising gaseous reactant to the reaction chamber through the supply conduits and to the coils through a header, and branches on the exit side of the reactor by which the gaseous products from the reaction chamber through the said discharge conduit and from the coils through a header are received for recycling as a joint stream for distribution to the coils and the reaction chamber.

5. Apparatus as set forth in claim 4 in which the heat exchange coils each comprises a number of superposed serpentines connected by intermediate pipes, the whole being continuous.

6. Apparatus as set forth in claim 4 in which the reaction chamber is insulated from the pressure vessel.

7. Apparatus as set forth in claim 4 wherein the gas recycle system includes at least one heat exchanger.

8. Apparatus as set forth in claim 4 wherein there are at least four coils each comprising a number of serpentines staggered with regards to those of adjacent coils.

9. Apparatus adapted for use with exothermic or endothermic chemical processes conducted under superatmospheric pressure in the liquid phase between reactants of which at least one is gaseous which comprises a hollow vessel capable of withstanding high pressure provided with end closures, a reaction chamber having enclosing walls and provided with end cover plates situated wholly within said vessel, conduits passing through the end closures of said vessel for supplying gas and liquid to said chamber, the gas conduit being capable of delivering gas to the vicinity of the bottom of said chamber, a plurality of heat exchange coils traversing the chamber, each of greater length within the chamber than the chamber and extending through and attached to the end plates thereof, said coils being arranged throughout the reaction chamber in the form of a close network serving to bring the ascending gas into intimate contact with the liquid within the chamber, headers situated between the end plates of the chamber and the closures of the vessel into which the coils lead, a gas recycle system comprising branches on the supply side of the reactor for distributing gaseous reactant to the reaction chamber through the supply conduits and to the coils through a header, and branches on the exit side of the reactor by which the gaseous products from the reaction chamber through the said discharge conduits and from the coils through a header are received for recycling as a joint stream for distribution to the coils and to the reaction chamber.

References Cited in the file of this patent

UNITED STATES PATENTS

| | | |
|---|---|---|
| 1,689,684 | Reed | Oct. 30, 1928 |
| 1,845,050 | Lantz et al | Feb. 16, 1932 |
| 1,858,822 | Frolich | May 17, 1932 |

(Other references on following page)

UNITED STATES PATENTS

| | | |
|---|---|---|
| 2,004,714 | Thompson | June 11, 1935 |
| 2,185,929 | Simpson et al. | Jan. 2, 1940 |
| 2,192,124 | Brill et al. | Feb. 27, 1940 |
| 2,271,017 | Lepestre | Jan. 27, 1942 |
| 2,283,832 | Thomas | May 19, 1942 |
| 2,486,693 | Spijker et al. | Nov. 1, 1949 |
| 2,491,618 | Luetzelschwab | Dec. 20, 1949 |
| 2,549,111 | Millendorf et al. | Apr. 17, 1951 |
| 2,564,456 | Vlugter et al. | Aug. 14, 1951 |

OTHER REFERENCES

Fiat Final Report 1000, PB–81383, listed in OTS Bibliography of Scientific & Industrial Reports, December 26, 1947; page 63 (Fig. 5).